US010393439B2

(12) United States Patent
Williams et al.

(10) Patent No.: US 10,393,439 B2
(45) Date of Patent: Aug. 27, 2019

(54) APPARATUS FOR REFINING MOLTEN ALUMINUM ALLOYS

(71) Applicant: PYROTEK, INC., Spokane, WA (US)

(72) Inventors: Tabb Williams, Spokane, WA (US); Michael Klepacki, Spokane, WA (US); Ryan Moran, Spokane, WA (US)

(73) Assignee: Pyrotek, Inc., Spokane, WA (US)

(*) Notice: Subject to any disclaimer, the term of this patent is extended or adjusted under 35 U.S.C. 154(b) by 148 days.

(21) Appl. No.: 15/501,573

(22) PCT Filed: Aug. 4, 2015

(86) PCT No.: PCT/US2015/043558
§ 371 (c)(1),
(2) Date: Feb. 3, 2017

(87) PCT Pub. No.: WO2016/022530
PCT Pub. Date: Feb. 11, 2016

(65) Prior Publication Data

US 2017/0219289 A1 Aug. 3, 2017

Related U.S. Application Data

(60) Provisional application No. 62/032,853, filed on Aug. 4, 2014.

(51) Int. Cl.
*C22B 21/00* (2006.01)
*F27D 3/16* (2006.01)
(Continued)

(52) U.S. Cl.
CPC .............. *F27D 3/16* (2013.01); *C22B 21/062* (2013.01); *C22B 21/064* (2013.01); *F27D 27/00* (2013.01);
(Continued)

(58) Field of Classification Search
CPC .......................................................... F27D 3/16
See application file for complete search history.

(56) References Cited

U.S. PATENT DOCUMENTS 3,767,382 A 10/1973 Bruno
4,784,374 A 11/1988 Pelton
(Continued)

FOREIGN PATENT DOCUMENTS

JP 2007-126720 A 5/2007

OTHER PUBLICATIONS

Supplemental partial European Search Report, completed Jan. 23, 2018, 5 pp.

*Primary Examiner* — Scott R Kastler
(74) *Attorney, Agent, or Firm* — Fay Sharpe LLP

(57) ABSTRACT

Disclosed is a flux injector assembly and method for refining a molten material, wherein at least a portion of the material is aluminum, as it flows through a trough. A dispensing rod having a hollow body and a dispensing rim is configured to allow a flux and/or inert gas to travel through the hollow body and be injected into the molten material through the dispensing rim as the molten material flows through the trough. A baffle plate is configured to be positioned within the molten material in the associated trough to allow the molten material to flow passed the baffle plate. The elongated dispensing rod is positioned at a downstream location relative to the baffle plate. The rate of flow of molten material is increased as it passes the dispensing rim of the elongated dispensing rod to inject and mix the flux within the molten aluminum alloy.

8 Claims, 6 Drawing Sheets

(51) Int. Cl.
*C22B 21/06* (2006.01)
*F27D 27/00* (2010.01)

(52) U.S. Cl.
CPC .. *F27D 2003/166* (2013.01); *F27D 2003/168* (2013.01); *F27D 2003/169* (2013.01)

(56) References Cited

U.S. PATENT DOCUMENTS

| | | | | |
|---|---|---|---|---|
| 5,462,581 | A | 10/1995 | Eckert | |
| 5,536,296 | A | 7/1996 | Ten Eyck et al. | |
| 8,025,712 | B2 | 9/2011 | Dupuis et al. | |
| 2003/0151176 | A1 | 8/2003 | Ohno et al. | |
| 2008/0202290 | A1 | 8/2008 | Chesonis | |
| 2009/0229415 | A1 | 9/2009 | Frank et al. | |
| 2014/0083253 | A1* | 3/2014 | Lutes | C22B 9/103 75/678 |
| 2017/0219289 | A1* | 8/2017 | Williams | C22B 21/062 |

* cited by examiner

APPARATUS FOR REFINING MOLTEN ALUMINUM ALLOYS

This application claims the benefit of U.S. Provisional Application No. 62/032,853, filed Aug. 4, 2014, the disclosure of which is herein incorporated by reference.

BACKGROUND

The present disclosure relates to an apparatus and method for refining molten aluminum alloys. It finds particular application in conjunction with a flux injection assembly configured to introduce flux to the molten aluminum alloy as it flows through a trough, and will be described with particular reference thereto. However, it is to be appreciated that the present exemplary embodiment is also amenable to other like applications.

Molten metals such as aluminum and aluminum alloys include trace amounts of impurities that are desired to be removed during refinement. In known refinement processes, aluminum is melted within a furnace and then transferred to a casting machine for metal formation. The aluminum is typically transferred from the furnace to the casting machine through a trough. The molten aluminum flows into the trough at an inlet and through the trough to exit at an outlet in a substantially continuous manner. In many instances, the trough includes a degassing treatment assembly and/or a filter that are intended to remove at least a portion of the impurities within the molten aluminum. Some of the impurities include dissolved hydrogen gas, particulates such as oxides, carbides, borides, alumina, magnesia, and various other elements such as dissolved alkali metals (sodium (Na), lithium (Li) and Calcium (Ca)). These impurities may cause undesirable effects in the casting process and to the properties of the finished product.

The treatment process generally utilized a flux injection mechanism that is configured to introduce a flux within the molten aluminum. Generally, flux comprises chlorine gas or mixtures of chlorine gas with an inert gas such as argon that, when combined, are known to assist with the removal of impurities from the molten aluminum. One such example of flux is marketed as PROMAG™ by Pyrotek, Inc of Spokane, Wash. Chlorine gas and chlorine salts are known to be effective in converting the alkali metals to salts which coalesce and rise to the surface of the molten material with the assistance of the inert gas. In particular, hydrogen gas diffuses into the inert gas bubbles and is removed as the particulate coalesces around the gas bubbles and rises to the top of the molten aluminum alloy. The flux and impurities form dross or a waste-by-product which is skimmed off periodically or captured in a downstream filter. Generally, the chlorine and/or chlorine salts are removed with the dross. However, there has been pressure to eliminate the use of chlorine gas in applications such as these because of the environmental damage and burden of handling.

An in-line flux injection mechanism is disclosed in U.S. Pat. No. 3,767,382, which utilizes chlorine and/or chlorine salts discloses a known process of refining aluminum. Additionally, an apparatus and process for in-line aluminum treatment is disclosed in U.S. Pat. No. 8,025,712, which is incorporated by reference herein. These mechanisms disclose a process for refining molten aluminum and molten aluminum alloys that utilizes various chambers including at least one dispenser having an elongated rotating shaft attached to an impeller. The impellers are adapted to rotate within the molten aluminum as flux is discharged through or at the rotating shaft and distributed by the impeller within the chamber. The impeller and rotating shaft are particularly utilized to distribute the flux within the molten alloy in a manner sufficient to provide a broad distribution of the flux within the molten alloy to chemically interact with a high percentage of the impurities therein while utilizing a minimum amount of chlorine gas or salts. The impurities then rise to the surface of the molten aluminum alloy and can be removed.

BRIEF DESCRIPTION

In accordance with one aspect of the disclosure, a flux injector assembly is provided for refining a molten material, wherein at least a portion of the material is aluminum, as it flows through a trough. The flux injector assembly includes an elongated dispensing rod having a hollow body and a dispensing rim that is configured to allow a flux and/or inert gas to travel through the hollow body and be injected into the molten material through the dispensing rim as the molten material flows through the trough. A baffle plate having a bottom edge is configured to be positioned within the molten material in the associated trough to allow the molten material to flow under the bottom edge of the baffle plate. The elongated dispensing rod is positioned at a downstream location relative to the baffle plate. The dispensing rim and the bottom edge are placed within the molten material where the rate of flow of molten material is increased as it passes the dispensing rim of the elongated dispensing rod to inject and mix the flux within the molten material.

In one embodiment, the dispensing rim of the elongated dispensing rod includes at least one notch positioned inwardly along the dispensing rim. This configuration allows for a lower gas flow or gas pressure through the dispensing rim thereby reducing the size of gas bubbles distributed from the dispensing rim thereby reducing an amount of turbulence along a surface of the molten material. This configuration assists with mixing the flux with the molten material.

In another embodiment, the dispensing rod is placed upstream of a baffle plate or chamber that is in fluid communication with the trough. The dispensing rim is positioned within the molten material and flux is distributed at a location upstream of the baffle plate. The flux becomes mixed with the molten material as it flows passed the baffle plate.

In another embodiment, a method of mixing flux within a flow of molten material is provided. An elongated dispensing rod having a hollow interior and a dispensing rim is provided within the flow of molten material. The dispensing rim of the dispensing rod is positioned adjacent to and downstream from a baffle plate within the flow of molten material. A flux is introduced to the dispensing rod to exit through the dispensing rim as the flow of molten material is manipulated as it flows passed the baffle plate. The flux is distributed into the flow of molten material having been manipulated by the baffle plate to increase the distribution area of the flux thereby improving flux mixing as it mixes within the flow of molten material.

In another embodiment, the dispensing rim of the elongated dispensing rod includes at least one notch positioned inwardly along the dispensing rim to assist with distributing the flux into the flow of molten material.

In a further embodiment, the flux injector assembly includes a vortex creating rotor in association with the elongated dispensing rod.

DETAILED DESCRIPTION

Reference will now be made in detail to the embodiments of the disclosure, examples of which are illustrated in the accompanying drawings. Whenever possible, like reference numbers will be used to refer to like components or parts. For purposes of this description, similar aspects among the various embodiments described herein will be referred to by similar reference numbers. Similar features may be described utilizing a reference number having an apostrophe (') or double apostrophe (") for clarity and this description is not limited as to the combination of features as described. As will be appreciated, however, the structure of the various aspects can be different among the various embodiments.

For purposes of this disclosure, the term "molten material" will be used to describe aluminum or a mixture of alloys that includes aluminum, other metal element or alloy that has been melted into a molten form and is not limited as to the various elements that are included therein. The term molten material as used herein, includes at least a portion of aluminum.

Figure 1:
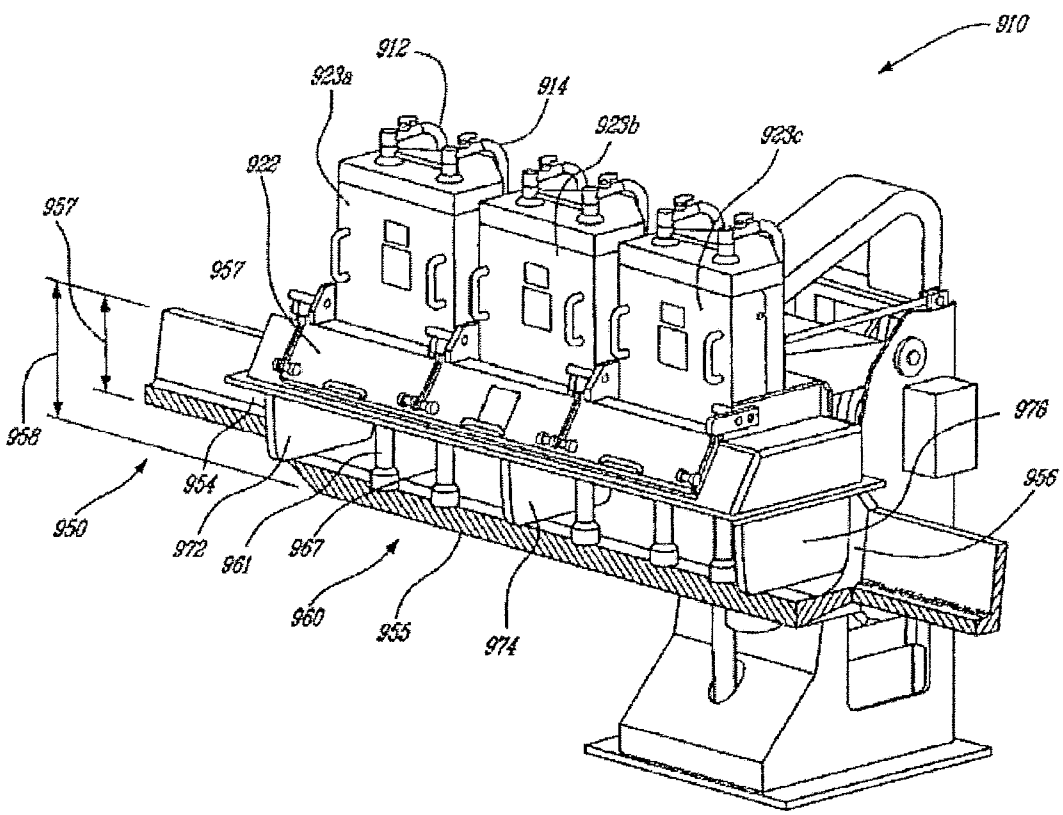
FIG. 1 is a perspective view of an in-line metal treatment system with baffles and a rotary dispenser in accordance with the prior art.

With reference to FIG. 1, a prior art embodiment as disclosed by U.S. Pat. No. 8,025,712 is illustrated that includes an apparatus 910 for introducing a flux to refine molten material. The apparatus 910 includes a trough 950 and a series of rotatable dispensers 960 wherein at least one of which is downstream of a baffle plate 974. The trough is a molten metal transfer launder which includes an upstream inlet 954 and a downstream outlet 956. The trough 950 is adapted to allow molten material to flow from the inlet to the outlet. Generally, the trough transfers the molten material from a furnace, configured to melt the aluminum material into the molten metal alloy, to a casting mechanism to form the molten material into a desired shape.

Each rotatable dispenser 960 requires a driving mechanism such as an electrical motor for importing rotatable motion to the impeller that is submerged within the flow of molten material. As described, the rotatable dispensers 960 are connected to a supply of gas that passes through the rotating shafts 961 of each dispenser 960 to be mixed with the molten material through internal passages of the rotating impellers. Baffle plates 972, 974 and 976 are positioned at various locations upstream and/or downstream of the series of rotatable dispensers 960 to allow the material to flow under and around and to assist with confining floating waste by-products (referred to as dross) at the surface of the material. The dross can be periodically removed, as the baffle plates prevent the dross from passing downstream and contaminating a filter attached to the outlet or contaminating the solidified final product. Notably, the rotatable dispensers 960 are located within various chamber separated by the baffle plates 972, 974 and 976 as the trough extends from the inlet and outlet of the chambers defined by the baffle plate 972 and 976.

Figure 2:
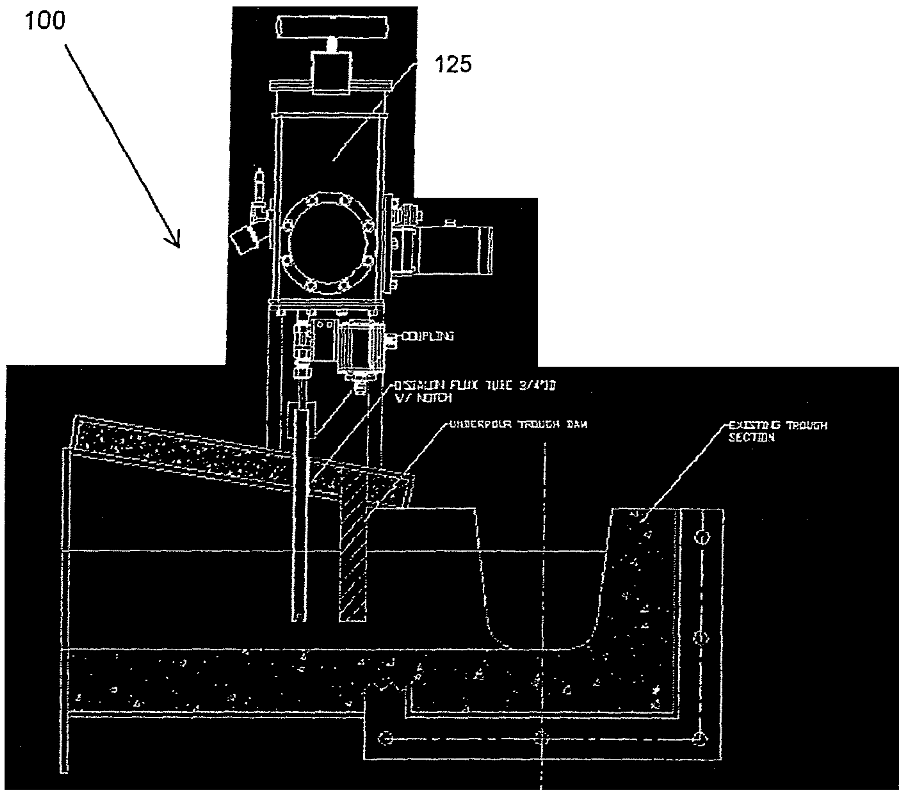
FIG. 2 is a cross sectional diagram of a flux injector assembly for refining a molten aluminum alloy as it flows through a trough in accordance with the disclosure.
Figure 3:
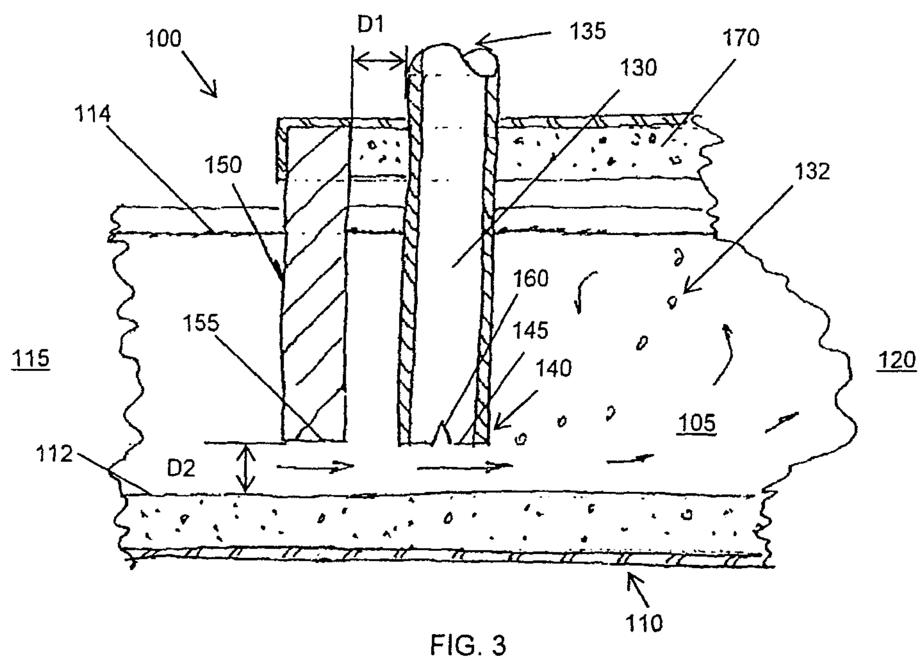
FIG. 3 is a cross sectional plan view of one embodiment of the flux injector assembly in accordance with the present disclosure.

With reference to FIGS. 2-3, a flux injector assembly 100 is provided for refining a molten material 105 as it flows through a trough 110 in accordance with the present disclosure. The trough 110 is configured to receive molten material 105 from a furnace (not shown) or other source through an inlet 115 and transfer the molten material to exit at an outlet 120.

Figure 8:
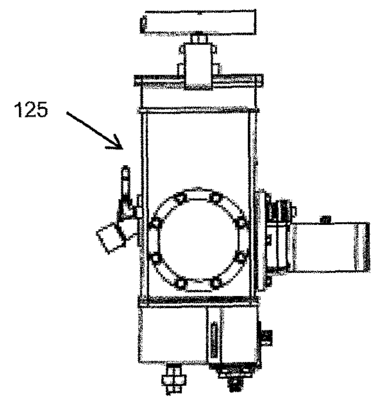
FIG. 8 is a plan view of a flux injector housing in accordance with the present disclosure.

A flux injection housing 125 is configured to store, measure and distribute a flux material to at least one elongated dispensing rod 130 to be injected into the molten material 105 within the trough 110. The housing 125 can be a pressurized type or a gravity fed type of flux injection mechanism as known in the art that is directly coupled to the dispensing rod 130. One exemplary flux injection housing 125 is illustrated by FIG. 8. The flux injection housing 125 can be configured to introduce flux alone or flux in combination with an inert gas into elongated dispensing rod 130.

The dispensing rod 130 includes an elongated hollow body that is coupled to the housing 125 at a first end 135 and has an opposite second end 140 that is configured to be placed within the flow of molten material 105. The dispensing rod 130 can be made from a ceramic material, refractory material, seamless alloy steel tube or could be made from a graphite material. The rod 130 can be coated in an enamel coating and have a smooth surface that resists bonding with the molten material, flux or other gasses.

The dispensing rod 130 allows a flux 132 to travel through the hollow body and be injected into the molten material 105 through a dispensing rim 145 as the molten material flows through the trough 110. The dispensing rim 145 is at the second end 140 of the dispensing rod 130 and can be configured in various geometric embodiments that interact with the flow of molten material to improve the distribution of flux 132 therein.

The assembly 100 includes a baffle plate 150 that is configured to be positioned within the trough 110 and be submerged within the flow of molten material 105. The baffle plate 150 is configured to manipulate the flow of molten material as it flows through the trough 110 and passes the baffle plate 150. The elongated dispensing rod 130 is positioned at a downstream location relative to the baffle plate 150. The baffle plate can have various orientations that assist to manipulate the flow of molten material 105.

In one embodiment, the dispensing rod 130 is spaced from the baffle plate 150 a first distance D1. The first dimension D1 can be less than 10 inches and more particularly less than 8 inches. In one embodiment, the first dimension is between 3 inches and 5 inches. However, this dimension can be varied depending on the configuration of the trough 110 and baffle plate 150 along with a height of the flow of material within the trough and the mass flow rate or velocity of the material.

In one embodiment, the baffle plate 150 includes a generally planar orientation having a bottom edge 155 that is submerged within the flow of molten material. In this configuration, the bottom edge 155 is a second dimension D2 from a bottom 112 of the trough 110 such that the flow of the molten material is manipulated as it passes the baffle plate 150. The second dimension D2 can be less than 5 inches and more particularly less than 3 inches. In one embodiment, the second dimension is between 0.5 inches and 3 inches. However, this dimension can be varied depending on the dimensions and configuration of the trough 110 and the location of the dispensing rim 145 relative to the baffle plate 150. In certain embodiments, D1 is less than two times D2, or D1 is less than 1.5 times D2, or D1 is substantially equal to D2.

In another embodiment, the baffle plate 150 can extend a width of the trough 110. This configuration allows for the flow of molten material to become generally turbulent at least adjacent to the location of the baffle plate 150 and dispensing rim 145. This particular locus of generally turbulent flow is relative to the generally laminar flow of molten material upstream (from the inlet 115) of the baffle plate 150. The manipulated flow of the molten material passes the dispensing rim 145 of the dispensing rod 130 and provides a greater distribution of flux 132 within the flow of material.

The dispensing rim 145 is placed the second distance D2 from the bottom 112 of the trough 110 such that the dispensing rim 145 is generally aligned with the bottom edge 155 of the baffle plate 150. In this configuration the dispensing rim 145 and the bottom edge 155 are placed within the molten material wherein the rate of flow of molten material is increased and/or manipulated as it passes the dispensing rim 145 of the elongated dispensing rod 130. This configuration increases the distribution of flux within the molten material as it is injected through the dispensing rod 130.

Figure 4:
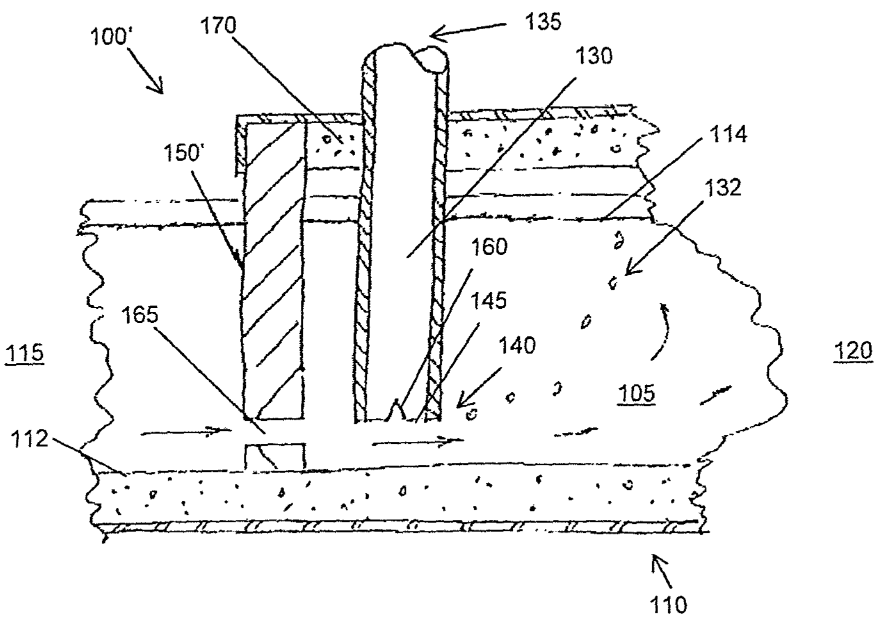
FIG. 4 is a cross sectional plan view of another embodiment of the flux injector assembly in accordance with the present disclosure.

In embodiment of FIG. 4, illustrated is another embodiment of a flux injector assembly 100' in accordance with the present disclosure. In this embodiment, a baffle plate 150' can be configured to extend within the tough 110 and include at least one aperture 165. The baffle plate 150' can abut the bottom 112 or come close to abutting the bottom 112 of the trough 110 such that the flow of molten material at least partially passes through the at least one aperture 165. In this configuration, the flow of molten material is manipulated as it passes through the aperture 165 so that the manipulated flow passes the dispensing rim 145 of the dispensing rod 130. There can be a plurality of apertures 165 or a single aperture 165 and the aperture(s) 165 can define a pattern or have various geometric configurations such as slits, crosses, circles, arcuate shapes or any polygonal shape such that the flow of molten material is manipulated as it passes through the at least one aperture 165. This configuration allows the manipulated molten material to pass the dispensing rim 145 as flux 132 is injected therein to increase the distribution of flux within the flow of molten material as it flows through the trough 110.

In one embodiment, the elongated dispensing rod 130 and the baffle plate 150 extend from a cover 170. The cover 170 supports the rod 130 and baffle plate 150 to ensure that the particular orientation of the rim 145 relative to the bottom edge 155 or aperture 165 is maintained. The housing 125 is also supported on the cover 170 such that the flux 132 can be gravity fed from the housing 125 through the dispensing rod 130. Additionally, the cover 165 is positioned over the trough 110 to allow the rim 145 and bottom edge 155 of the baffle plate 150 to be submerged within the flow of molten material in a desired position to ensure that the flow is manipulated as disclosed herein.

In another embodiment, the elongated dispensing rod 130 can be aligned in a generally perpendicular manner relative to the baffle plate 150. However, both the dispensing rod 130 and the baffle plate 150 can alternately be angled in an upstream or a downstream direction so long as the flow of molten material is manipulated as it passes the dispensing rim 145 within the trough 110.

Additionally, the dispensing rim 145 can include various geometries that assist to distribute the flux 132 within the flow of molten material. In one embodiment, the dispensing rim 145 includes a notch 160 that extends inwardly along the rod 130. Alternatively, the dispensing rim 145 can include a plurality of notches 160 that each extend inwardly along the rod 130. This configuration allows for a lower gas flow or gas pressure through the dispensing rim thereby reducing the size of flux 132 or gas bubbles as they are distributed from the dispensing rim thereby reducing an amount of turbulence along a surface 114 of the molten material 105. This configuration assists with mixing the flux 132 with the molten material after having been manipulated by the baffle plate 150. The at least one notch 160 can have a variety of shapes such as a semi-circle, triangular, oval, or polygonal shape.

Various other shapes and configurations of the dispensing rim 145 are contemplated by this disclosure. In particular, the dispensing rim 145 could include an angled orientation in which the cross section of the rim 145 is generally angled relative to a central axis of the rod 130. Additionally, the rim 145 could also include various protrusions such as a flared lip, radial flange, or fins of various shapes. Optionally, the rim 145 could also include a cross sectional opening that is flattened in the shape of a slit. The various shapes and orientations of the rim 145, as contemplated by this disclosure, assist to inject flux in a manner that reduces turbulence of the flow along the surface and to provide a more uniformly distributed mixture of flux and/or gas within the flow of molten material as it is manipulated by the baffle plate 150. The rod 130 is therefore not required to be rotatable.

Figure 5:
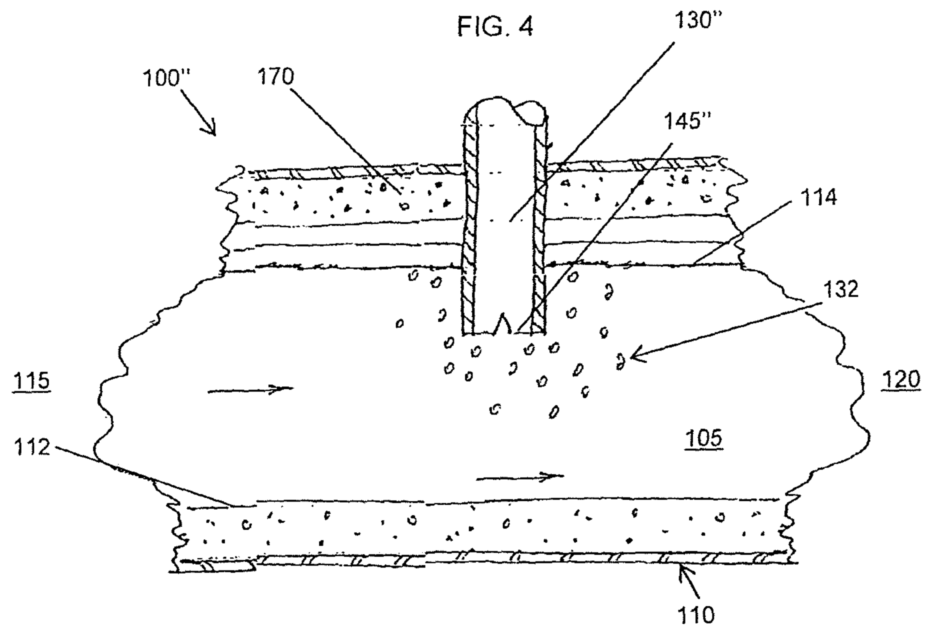
FIG. 5 is a cross sectional plan view of yet another embodiment of the flux injector assembly in accordance with the present disclosure.

FIG. 5 illustrates another embodiment of a flux injector assembly 100" in accordance with the present disclosure. In this embodiment, a dispensing rod 130" is placed upstream of a baffle plate (not shown). In this embodiment, the dispensing rod 130" includes a dispensing rim 145" that is placed within the flow of molten material 105 at a position under the surface of the flow of molten material and upstream from an additional refinement filter or degassing assembly or rotatable dispensers (not shown) that are in fluid communication with the trough 110 towards the outlet 120. The dispensing rim 145" is located within the molten material 105 at a position that is closer to the surface 114 of the molten material 105 than to the bottom 112 of the trough 110 and flux 132 is distributed therein. In this embodiment, the dispensing rim 145" is at a location upstream of any other assemblies or baffle plates. The flux 132 becomes mixed with the molten material 105 as it flows passed the dispensing rim 145" and enters into the other degassing assemblies or passes the baffle plates.

Figure 6:
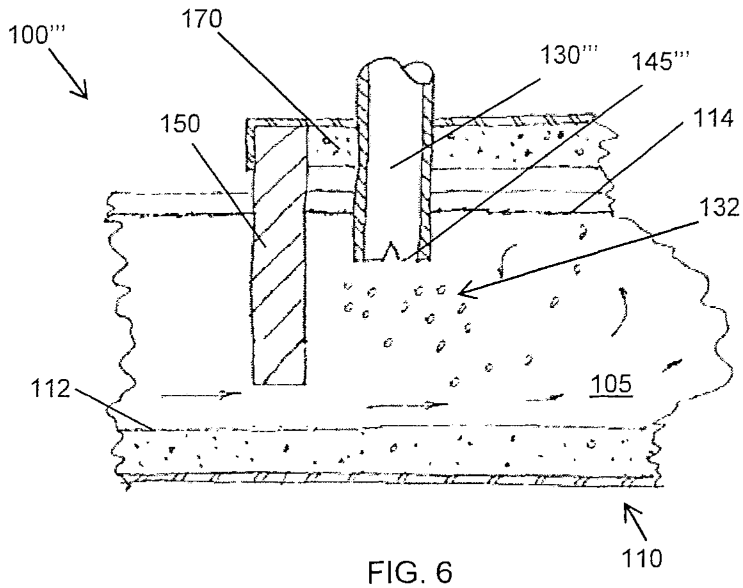
FIG. 6 is a cross sectional plan view of another embodiment of the flux injector assembly in accordance with the present disclosure.

FIG. 6 illustrates another embodiment of the assembly 100m. A dispensing rod 130''' is placed downstream of the baffle plate 180. In this embodiment, the dispensing rod 130''' includes a dispensing rim 145''' that is placed within the flow of molten material 105 at a position under the surface 114 of the flow of molten material and upstream from any additional refinement filter, degassing assembly or rotatable dispensers (not shown) that are in fluid communication with the trough 110 towards the outlet 120. The dispensing rim 145''' is located at a shallow position within the molten material 105 at a position that is closer to the surface 114 of the molten material 105 than to the bottom 112 of the trough 110 and flux 132 is distributed therein. The flux 132 becomes mixed with the molten material 105 as it flows passed the dispensing rim 145''' and flows towards any other degassing assemblies, rotatable dispensers, subsequent chambers or additional downstream baffle plates.

Figure 9A:
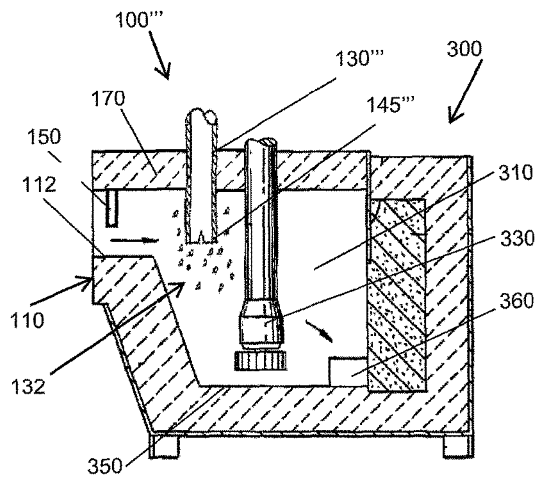
FIG. 9A is a cross sectional side view of another embodiment of the flux injector assembly in accordance with FIG. 6 of the present disclosure.
Figure 9B:
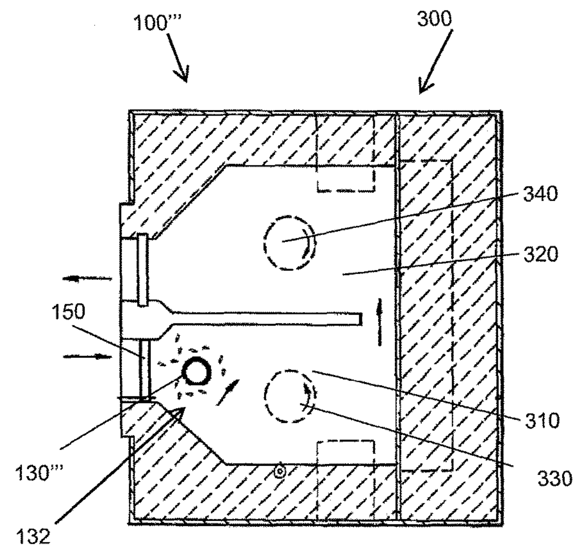
FIG. 9B is a cross sectional bottom view of the flux injector assembly in accordance with FIG. 9A of the present disclosure.

Additionally, in the embodiment illustrated by FIGS. 9A and 9B, the dispensing rod 130''' and the dispensing rim 145''' is at a location that can be considered within a first chamber 310 of a refining system assembly 300. One example of such a refining system assembly is the SNIF® refining system assembly that is available from Pyrotek, Inc. of Spokane, Wash. However, this disclosure is not limited as other systems or assemblies may be combined with the features of the presently disclosed assembly 100'''. Notably, the trough 110 is in fluid communication with the refining system assembly 300 and molten material 105 flows passed the baffle plate 150 and enters the first chamber 310 of the refining system assembly 300. Molten material passes the dispensing rod 130''' and dispensing rim 145''' as flux 132 is introduced therein. The molten material and flux flows passed a first rotatable dispensing impeller 330 within the first chamber 310 and transfers to a second chamber 320 with a second rotatable impeller 340. Flux 132 is injected from the dispensing rod 145''' upstream of the first and second rotating impellers 330, 340. Additionally, in this embodiment, a bottom 350 of the first chamber 310 is lower than the bottom 112 of the trough 110 whereby molten material flows downwardly and through an opening 360 between the first and second chambers 310, 320. This arrangement further manipulates the flow of molten material and provides additional mixing of the flux therein.

These assemblies 100, 100', 100", 100''' can be combined with various other degassing assemblies that are known in the prior art. In particular, the assemblies can be positioned upstream of at least one baffle plate or rotatable dispenser that include an impeller configured to provide flux or an inert gas within the flow of molten material. Additionally, a plurality of dispensing rods 130 can be provided within the assembly 100. The plurality of dispensing rods 130 can be attached to the housing 125 or have additional housings 125 for metering and providing flux and or an inert gas therein. Additionally, the assembly 100 can be used within a trough 110 that includes various sections and geometries that interrupt the flow of molten material in various ways. Further, the assembly 100 can be provided at an upstream location from various types of molten material filters. In particular, the dispensing rod 130" of the assembly 100" can be placed upstream of additional refining system assemblies that are generally known in the art such as the SNIF® refining system assembly that is available from Pyrotek, Inc, of Spokane, Wash.

Figure 7:
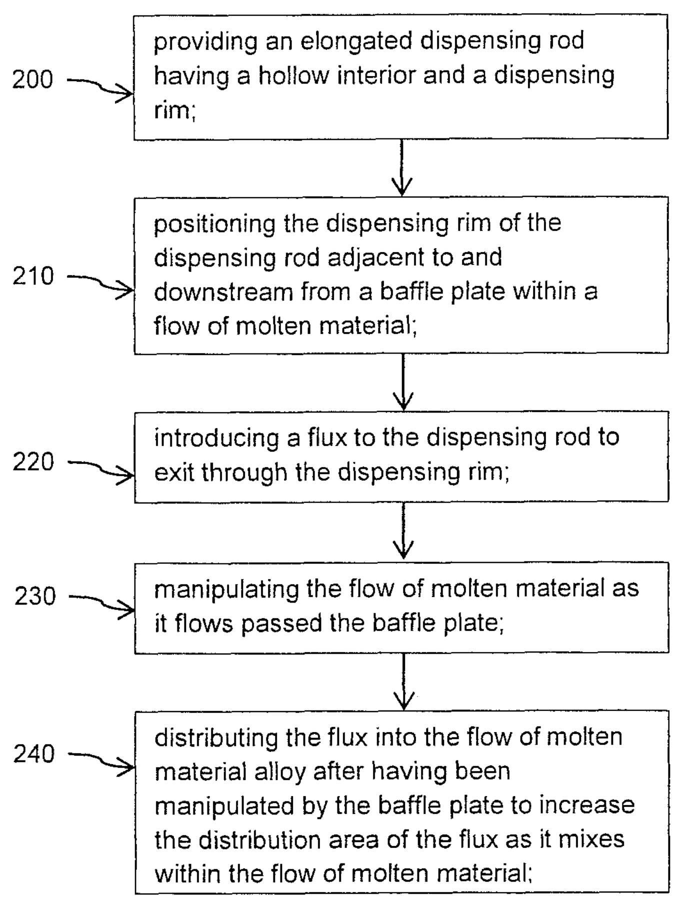
FIG. 7 is a flow chart of a method for mixing flux in a molten aluminum alloy in accordance with the present disclosure.

FIG. 7 is a flow chart that discloses a method of mixing flux within a flow of molten aluminum alloy. In step 200, the elongated dispensing rod is provided within the trough 110. The rod 130 has a hollow interior with the dispensing rim submerged within the flow of molten material. In step 210, the dispensing rim 145 of the dispensing rod 130 is positioned adjacent to and downstream from the baffle plate 150 within the flow of molten material. In step 220, flux is introduced to the dispensing rod 130 to exit through the dispensing rim 145.

The design parameters can be based on some consideration regarding the velocity and the volume of molten material as it traverses through the trough 110. In particular, the flow of molten material is generally laminar at an upstream location of the baffle plate 150. In step 230, the flow of molten material is manipulated as it flows passed the baffle plate and becomes generally turbulent after passing the baffle plate 150 within the trough 110. This generally turbulent flow is particularly located near the dispensing rim 145. The location of the dispensing rim 145 is positioned downstream of the baffle plate 150 and near the bottom edge 155 such that the generally turbulent flow passes under the dispensing rim 145. In step 240, the flux is distributed into the flow of molten material after having been manipulated by the baffle plate 155 to increase the distribution area of the flux as it mixes within the flow of molten material.

The dispensing rim 145 of the elongated dispensing rod includes at least one notch 160 positioned inwardly along the dispensing rim to assist with distributing the flux into the flow of molten aluminum alloy.

Figure 10A:
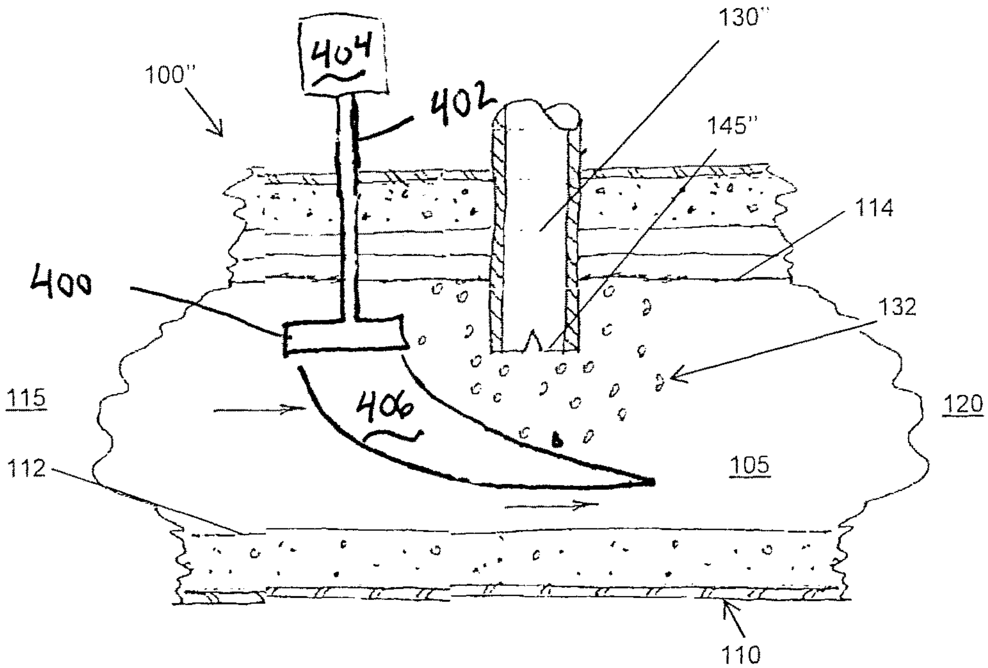
FIG. 10A is a cross-sectional plan view of another embodiment of the flux injection assembly wherein a rotor has been added.
Figure 10B:
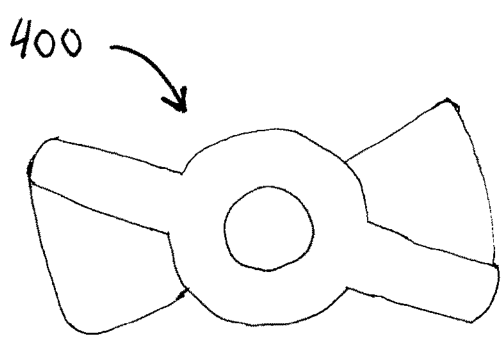
FIG. 10B is a top plan view of an exemplary rotor.

With reference to FIGS. 10A and 10B, the present disclosure further contemplates the addition of a rotor 400 adjacent the elongated dispersing rod 130. Particularly, rotor 400 can be suspended in the molten material 105 via a shaft 402. Shaft 402 is mated to a motor 404 in any manner conventional in the art. Advantageously, because flux/inert gas are not required to be introduced via shaft 402 as that function is performed by elongated rod 130, the mechanical mating between motor 404 and shaft 402 is less complex and costly and can be more robust. Operation of motor 404 results in the simultaneous rotation of shaft 402 and rotor 400. It is anticipated that rotor 400 can aid in the dispersion of the flux material being introduced through elongated rod 130. In particularly, rotor 400 can be located adjacent elongated rod 130 at a location which facilitates the formation of a vortex 406 in the region where flux enters the molten material. As used herein, the term vortex is intended to reflect a rotation of molten material having an orientation distinct from the motion of flow of the remaining molten material within the trough. The rotor can be positioned upstream of the elongated rod such that the vortex extends into the flow of molten material as it travels past the dispensing rim 145. Alternatively, in certain embodiments, it may be desirable for the rotor and the associated vortex to be positioned downstream from the elongated rod. As a further contemplated alternative, it is feasible that the shaft and impeller assembly could be configured to pass through the elongated rod.

The rotor can be of any shape suitable for the creation of a vortex. Advantageously, the complex rotor designs of traditional degassing apparatus may not be required. For example, the propeller style of FIG. 10B can be easily constructed of graphite or refractory ceramic and formed by machining or casting.

The various embodiments of the disclosure have been described. Obviously, modifications and alterations will occur to others upon reading and understanding the preceding detailed description. It is intended that the embodiments are construed as including all such modifications and alterations insofar as they come within the scope of the appended claims or the equivalents thereof.

The invention claimed is:

1. A method of mixing flux within a flow of a molten material, at least a portion including aluminum, the method comprising:

providing an elongated non-rotating dispensing rod having a hollow interior and a dispensing rim;

positioning the dispensing rim of the dispensing rod adjacent to and downstream from a baffle plate within a flow of molten material;

introducing a flux to the dispensing rod to exit through the dispensing rim;

manipulating the flow of molten material as it flows passed the baffle plate; and distributing the flux into the flow of molten material after having been manipulated by the baffle plate to increase the distribution area of the flux as it mixes within the flow of molten material.

2. The method of mixing flux of claim 1 wherein the dispensing rim of the elongated dispensing rod includes at least one notch positioned inwardly along the dispensing rim to assist with distributing the flux into the flow of molten material.

3. The method of mixing flux of claim 1 further comprising providing a cover wherein the elongated dispensing rod extends from the cover and into the flow of molten material.

4. The method of mixing flux of claim 1 further comprising providing a cover wherein the baffle plate extends from the cover and into the flow of molten material.

5. The method of mixing flux of claim 1 further comprising providing a cover wherein the baffle plate and the elongated dispensing rod extend from the cover and into the flow of molten material.

6. The method of mixing flux of claim 1 wherein the dispensing rim is positioned within the molten material in vertical alignment with the bottom edge of the baffle plate.

7. The method of mixing flux of claim 1 wherein the baffle plate includes at least one aperture for manipulating the flow of molten material as it passes the baffle plate.

8. The method of mixing flux of claim 1 wherein a vortex forming rotor is positioned adjacent the elongated dispensing rod.

* * * * *